Nov. 1, 1932.   C. A. SAWTELLE   1,885,551
VARIABLE LEVERAGE BRAKE MECHANISM
Filed June 24, 1929   2 Sheets-Sheet 1
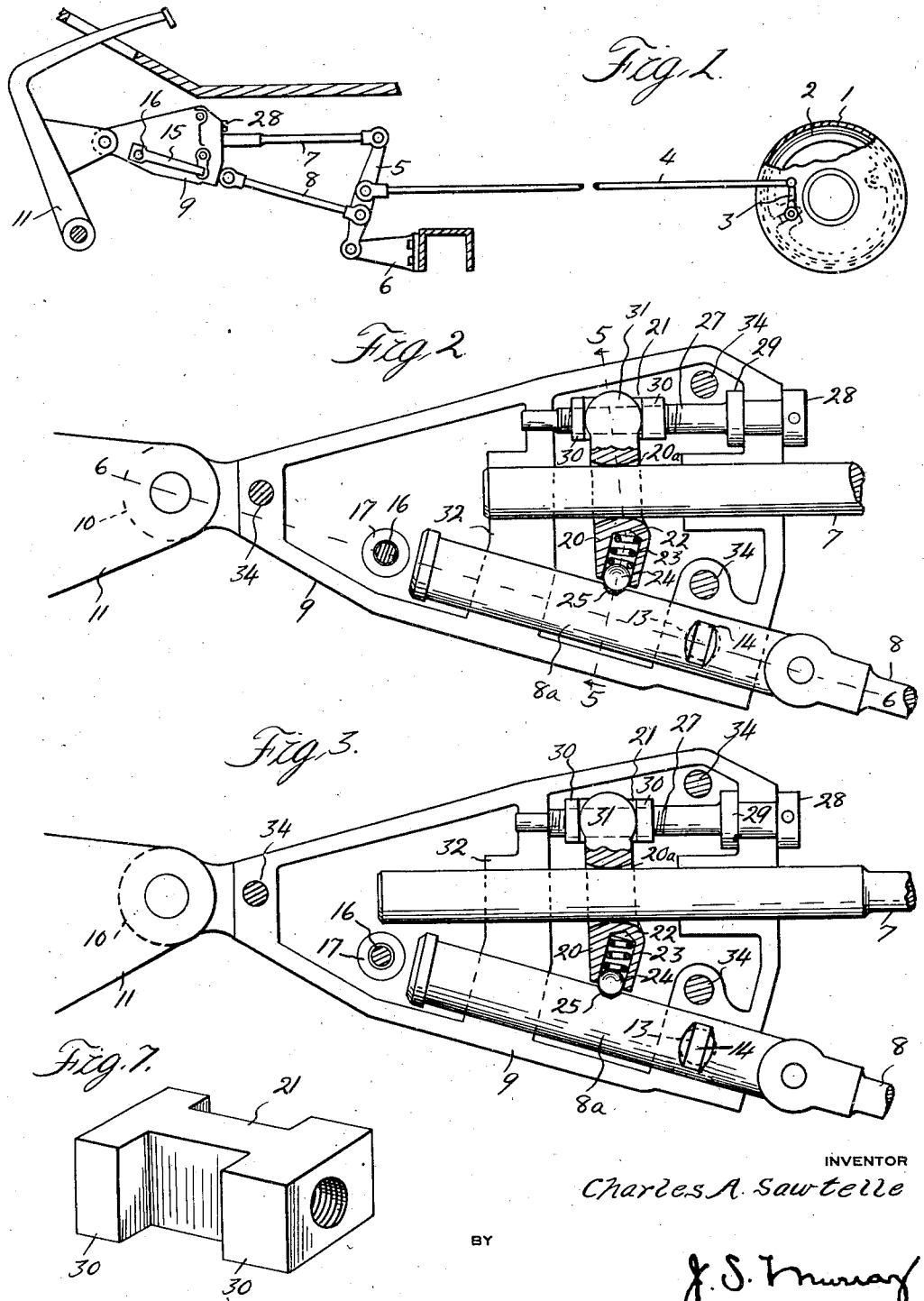
INVENTOR
Charles A. Sawtelle
BY
J. S. Murray
ATTORNEY

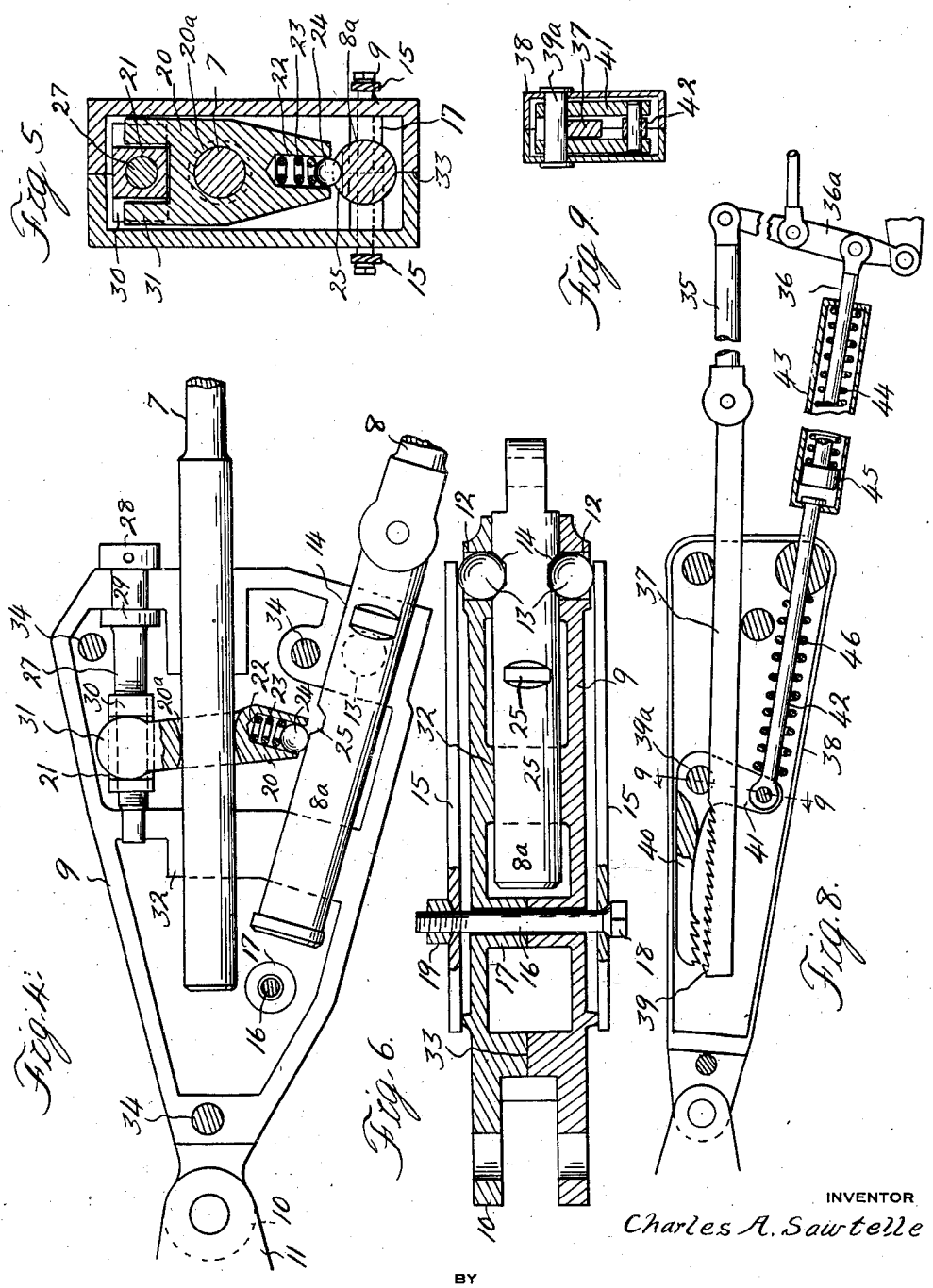

Patented Nov. 1, 1932

1,885,551

UNITED STATES PATENT OFFICE

CHARLES A. SAWTELLE, OF DETROIT, MICHIGAN, ASSIGNOR, BY DIRECT AND MESNE ASSIGNMENTS, TO S. AND D. ENGINEERING COMPANY, OF DETROIT, MICHIGAN, A CORPORATION OF MICHIGAN

VARIABLE LEVERAGE BRAKE MECHANISM

Application filed June 24, 1929. Serial No. 373,274.

This invention relates to lever operating mechanisms and particularly to mechanisms for operating a brake through a lever.

In operating vehicle brakes, a certain amount of lost motion must be taken up and the shoes or bands of the brakes must be advanced into their drum-engaging positions before any braking stress is exerted. There are also various other mechanisms, the operation of which involves a certain amount of relatively free movement before the working load takes effect. It is necessary in a brake control mechanism (and in various other mechanisms) to provide for the exercise of considerable leverage, so that a powerful braking (or other) effect may be exerted responsive to a moderate muscular (or other) effort, but the permissible travel of the foot pedal or other initially acting control element is limited. It is desirable therefore to minimize such travel of the foot pedal or its equivalent as is merely preliminary to applying the actual braking or other working force, so that the remaining permissible travel of said pedal may be utilized to apply a maximum leverage. In other words, the magnitude of leverage which may be effectively exerted is dependent on the magnitude of travel which is afforded the pedal or other control element when lost motion and other free motion has been taken up.

It is an object of the present invention to minimize the preliminary free travel of a brake pedal or other control element by providing two connections therefrom to the controlled mechanism, one of which initially acts responsive to a slight travel of the pedal to rapidly shift said mechanism, while the other takes effect under the actual braking stress, applying a powerful leverage but requiring a considerable travel of the pedal to exert such leverage.

Another object is to control a vehicle brake or other part through a pivotal lever and to effect an automatic shifting of the point of application of power to said lever, so that the brake band, shoe, or other controlled part may be rapidly actuated to its effective position, and an increased leverage be applied when said position is established.

A further object is to accomplish the aforesaid result by extending a pair of pull rods from a pivotal lever to a control element, to adapt one of said rods to initially respond to said control element, to associate a clutch with said rods, and to utilize the resistance offered by the initially acting rod when the load is applied to operatively engage the other rod with said control element through said clutch.

These and various other objects the invention attains by the construction hereinafter described and illustrated in the accompanying drawings, wherein:

Fig. 1 is a diagrammatic side elevational view of the improved control system as applied to a rear wheel vehicle brake.

Fig. 2 is a longitudinal, vertical, sectional view of an automatic clutch mechanism for successively bringing into use two pull rods, differentially acting upon the brake, the normal position of the parts being shown.

Fig. 3 is a view similar to Fig. 2, showing the positions of the parts after exercise of an initial control through which lost and other free motion has been taken up.

Fig. 4 is a similar view, showing the automatic clutch taking effect as when an actual braking restraint is being exercised.

Fig. 5 is a cross sectional view of the clutch mechanism taken upon the line 5—5 of Fig. 2.

Fig. 6 is a longitudinal sectional view taken upon the line 6—6 of Fig. 2.

Fig. 7 is a perspective view of an adjustable nut, forming an element of said clutch mechanism.

Fig. 8 is a view similar to Fig. 2, but showing an alternative automatic clutch mechanism.

Fig. 9 is a cross-sectional view of the same taken upon the line 9—9 of Fig. 8.

In these views, the reference character 1 designates the drum, 2 the brake band, and 3 the adjacent pivotal lever of a common type of rear wheel brake.

From the lever 3 a pull rod 4 extends forwardly to intermediately engage a lever 5 pivoted at its lower end upon any desired portion 6 of the frame. To the lever 5 is pivotally connected a pair of pull rods 7 and 8, the former engaging the upper end and the latter the lower portion of said lever, preferably, between its pivotal support and the rearwardly extending rod 4. The rods 7 and 8 extend convergently forward, one above the other, and the forward end of the rod 7 is slidable in the rear wall of the casing 9 of an automatic clutch. The rod 8 is pivoted at its forward end to a rod 8a slidable in the rear wall of said casing and convergent toward the rod 7, similarly to the rod 8. Said casing has its forward end formed integrally with an eyelet 10 pivoted upon or otherwise connected to a foot lever 11, preferably at an intermediate point of the latter.

The rear wall of said casing is formed at each side of the rod 8a with openings 12 receiving a pair of ball detents 13 normally yieldably pressed into a pair of notches 14 oppositely formed in the sides of the rod 8a, the front and rear walls of each of said notches being reversely beveled. The desired pressure may be applied to said detents in various ways, the preferred provision being a pair of leaf springs 15 exteriorly carried by the casing and engaging said balls at their rear ends. The forward ends of said springs are preferably secured to the casing by a common bolt 16 passing through a sleeve 17 formed interiorly integral with the casing, said bolt being headed as indicated at 18 against one of said springs and carrying a nut 19 clamped against the other. This arrangement allows the bolt 16 to float transversely of the casing 9 to equalize the pressures applied by the two springs to said detents. By virtue of said detents, a forward actuation of the casing 9 will carry the rod 8a forward with said casing until the resistance offered by said rod is sufficient to overcome the force exerted by the springs 15 to maintain the detents in said notches.

The rod 7 is engaged within the casing 9 by a clutch member 20, having a substantially central aperture 20a to receive said rod and having its upper end portion pivoted upon a member 21 secured to the casing 9, as will be presently described.

The lower end of said clutch member is formed with a socket 22 extending transversely to the rod 8a and receiving a coiled spring 23 pressing a ball detent 24 against said rod and normally into a notch 25 formed in the top face of the rod. The front and rear walls of said notch are reversely beveled similarly to those of the notches 14.

The described arrangement is such that the clutch member 20 is normally maintained substantially transverse to the rod 7, owing to the notch 25 being so spaced from the notches 14 that the former notch lies substantially in the central plane of the clutch member when the latter notches are engaged by the detents 14. That is to say, when the rod 8a is so connected to the casing 9 as to be forwardly actuable in unison with said casing, the clutch member 20 is held by the rod 8a transverse to the rod 7. When, however, the rod 8a offers such resistance to forward actuation as to unseat the detents 13 from the notches 14, the casing 9 is free to continue its forward travel, sliding on the rod 8a, whereby a rearward drag is exerted through the detent 24 on the lower end of the clutch member. The effect of such drag is to tilt said clutch member to the position shown in Fig. 4, in which it binds upon the rod 7 rigidly connecting the latter to the casing 9. To accentuate the binding response of said clutch member to such tilting actuation thereof, the opening 20a has its top and bottom walls slightly curved to diverge forwardly and rearwardly from said rod.

It is desirable in the initial installation of the described control mechanism to accurately adjust the clutch member 20 to a position permitting the rod 7 to slide freely through the clutch member in the normal position of the latter. Provision is made for such adjustment by giving the pivot-forming member 21 the nature of a nut, engaged by an adjusting screw 27 journaled in the top portion of the casing 9 parallel to the rod 7, and formed with a head 28 exteriorly of the casing for manually rotating said screw. Said screw rigidly carries a collar 29 interiorly engaging the rear wall of the casing 9 to resist the heavy stress acting rearwardly of said screw during a braking control. The nut 21 is formed upon each side face thereof with a pair of spaced flanges 30, and the upper end of the clutch member is bifurcated to form a pair of lugs 31 which engage between the paired flanges 30 and preferably have circular faces contacting with said flanges. By a rotative adjustment of the screw 27 the nut 21 may be fed forwardly or back upon said screw to regulate the position of the pivotal upper end of the clutch member relative to its lower extremity. Preferably the casing 9 is formed with an interior transverse wall 32 in its central longitudinal portion, which provides slide bearings for the rods 7 and 8 additional to those formed by the rear wall of the casing 9, and said partition may furthermore serve to journal the forward end of the screw 27.

To provide for a ready assembly of the clutch mechanism in the casing 9 and to permit access to said mechanism as occasion arises, it is preferred to form the casing in two parts, meeting in the longitudinal, central vertical plane of the casing, as indicated at 33, and rigidly connected in any desired manner, as by bolts 34.

The construction is one that excludes dust and dirt from the encased mechanism, and permits pa ;ing the latter in grease to insure an easy operation.

In that form of the invention illustrated in Fig. 8, there are provided upper and lower forwardly convergent pull rods 35 and 36, engaging a lever 36a at their rear ends as previously described. The upper rod 35 in this construction is pivoted to a bar 37 slidable in the rear wall of the casing 38 and formed upon the top face of its forward end with a rack of transverse ratchet teeth 39. Above said bar and within said casing, there is pivoted at 39a a bell crank comprising an arm 40 forwardly projecting above the bar 37 and terminally formed upon its under face with a rack of transverse ratchet teeth, coacting with those of said bar. Said bell crank further comprises a bifurcated downwardly projecting arm 41 which straddles the bar 37 and has its lower end pivotally engaged by a rod 42 slidable in the rear wall of the casing. Rearwardly of the casing, said rod is headed within a tubular housing 43 into which the rod 36 slidably extends. A spring 44 coiled on the rod 36 within said housing is compressed between the rear end of the housing and a head 45 on the forward end of said rod. A spring 46 coiled upon the rod 42 between the rear wall of the casing 9 and the bell crank arm 41, tends to normally maintain the upper bell crank arm raised clear of the bar 37, and is sufficiently stiff to resist stresses applied during initial forward actuation of the casing 38, to move the brake band or shoe into engagement with the drum and take up lost motion.

When such engagement is established, the resistance offered by the rod 42 to forward travel is largely increased, whereby the spring 46 is overcome and the bell crank arm 40 is sufficiently tilted to operatively engage its teeth with those of the bar 37. The continued application of a forward stress to the casing 38 then acts to transmit such stress rearwardly from said casing through the rod 35, which is adapted to apply relatively powerful leverage. The spring 44 undergoes compression when the rod 35 thus transmits the pull, thus allowing for the relatively gradual forward travel of the rod 36 as compared to that of the rod 35 and casing, resulting from the differential connections of said rods to the lever 36a. Preferably the spring 44 will be slightly stiffer than the spring 46 so that the latter will yield in advance of the former. This is because the arm 40 should be swung down before the yielding of the spring 44 occurs.

The described construction, in either of the forms shown, permits the application of a brake under considerably greater leverage than is possible under present practice.

The construction is not limited to its application to muscularly applied brakes, nor to brake mechanisms, and can be employed to advantage wherever it is desired to take up all preliminary travel of a control mechanism with minimum travel of point of application of the controlling force.

What I claim is:

1. The combination with a pivotal lever and an actuating element for said lever, of a connection from said element to said lever operative to actuate the lever in an initial relatively free travel thereof, a second connection from said element to said lever, engaging the lever at a point more remote from its pivot than the point of engagement of the first connection, and means for automatically breaking the first connection and establishing the second connection responsive to the application to the lever of its working load.

2. The combination with a pivotal lever, of a pair of pull rods engaging said lever at unequal distances from its pivot, an actuating element, means normally yieldably connecting said element to the pull rod affording a lesser leverage, and means responsive to a yielding of said connection for connecting the other pull rod to said element.

3. The combination with a pivotal lever and an actuating element therefor, of a pair of pull rods engaging said lever at unequal distances from its pivot and convergently extending toward said actuating element, means establishing a connection between the actuating element and the pull rod affording lesser leverage, said connection being yieldable under predetermined stress, a clutch member for connecting the other pull rod to said actuating element normally occupying declutched position, and means for shifting said clutch member into its effective position responsive to a yielding of said yieldable connection.

4. The combination with a pivotal lever and an actuating element therefor, of a pair of pull rods engaging said lever at unequal distances from its pivot, and converging toward said actuating element, a support for the adjacent ends of said pull rods carried by said actuating element and affording said rods a relative longitudinal travel, means upon said support resisting travel relative to said member of the pull rod affording lesser leverage, said means being yieldable under predetermined stress, and means carried by said support for establishing a pull connection to said support of the rod affording greater leverage, responsive to a travel of the other rod relative to said support.

5. The combination with a pivotal lever of a pair of pull rods engaging said lever at unequal distances from its pivot and extending convergently therefrom, a support slidably engaged by the adjacent ends of said rods, means engaging said support for applying a pull to one or the other of said rods, and means for automatically transferring the applied pull from one to the other of said rods, responsive to a predetermined increase in the working load.

6. The combination with a pivotal lever and a pair of pull rods engaging said lever at unequal distances from its pivot, of a support for the ends of said rods remote from said lever, means engaging said support for applying a pull to one or the other of said rods, means yieldably connecting the rod affording lesser leverage to said support for operation thereby, a clutch member pivoted upon said support for operatively connecting the other of said rods to said support, and means for pivotally actuating said clutch member to operatively engage the rod controlled thereby with said support, responsive to the yielding of said yieldable connection.

7. The combination with a pivotal lever and a pair of pull rods engaging said lever at unequal distances from its pivot and convergently extending from said lever, a member slidably engaged by the adjacent ends of said rods, means establishing a yieldable actuating connection between said member and the rod affording lesser leverage, a clutch member pivoted at one end upon said member and having its other end yieldably engaging said rod affording lesser leverage and formed between its ends with an opening receiving the other rod, whereby the travel of the lesser leverage rod relative to said supporting member acts to tilt said clutch member to operatively connect the greater leverage rod to said member.

8. The combination with a pair of pull rods, of an actuating member slidably engaged by said rods, a clutch member pivoted upon the actuating member and intermediately engaging one of said rods, a detent carried by said clutch member yieldably bearing upon the other of said rods, the latter being notched to receive said detent, and means yieldably connecting the notched rod to said actuating member for initial operation thereby.

9. The combination with a pair of pull rods and a common actuating member for said rods yieldably engaged thereby, one of said rods being formed with opposed notches, a pair of detents carried by said actuating member and normally engaged in said notches, means carried by the actuating member yieldably retaining said detents in said notches, and means responsive to travel of said notched rod, relative to the actuating member for operatively connecting the other rod to said member.

10. The combination with a pair of pull rods and a common actuating member slidably engaged by said rods, of means normally yieldably connecting one of said rods to said member for actuation thereby, a clutch mounted upon said member acting upon the other of said rods to operatively connect the same to said member, responsive to a yielding of said connection, and means for positively connecting the first-named rod to said member in the event of failure of said clutch to act.

11. The combination with an actuating and an actuated lever of two actuating connections between said levers, engaging one of said levers at unequal distances from its pivot, and means for automatically breaking one of said connections and establishing the other responsive to application to said levers of their working load.

12. The combination with a pair of levers, of an actuating connection between said levers comprising a pair of pull rods engaging one of said levers at unequal distances from its pivot, a yieldable actuating connection from one of said pull rods to one of said levers, and means for operatively connecting the other pull rod to said lever, responsive to a yielding of said connection.

13. The combination with a pair of pivoted levers, of a pair of pull rods engaging one of said levers at unequal distances from its pivot, and convergently extending toward the other of said levers, an actuating connection between the last mentioned lever and the pull rod affording lesser leverage, said connection being yieldable under predetermined stress, a clutch member for connecting the other pull rod to the last mentioned lever, normally occupying a declutched position, and means for shifting said clutch member to its effective position responsive to yielding of said yieldable connection.

14. The combination with an actuating and an actuated lever, of a pair of pull rods engaging one of said levers at unequal distances from its pivot and converging toward the other of said levers, a support for the adjacent ends of said pull rods carried by the last-mentioned lever and affording said rods a relative longitudinal travel, means upon said support resisting travel relative thereto of the pull rod affording lesser leverage, said means being yieldable under predetermined stress, and means carried by said support for establishing a pull connection to said support of the rod affording greater leverage, responsive to a travel of the other rod relative to said support.

In testimony whereof I sign this specification.

CHARLES A. SAWTELLE.